United States Patent
Lin

(10) Patent No.: US 11,304,202 B2
(45) Date of Patent: Apr. 12, 2022

(54) METHOD FOR TRANSMITTING UPLINK CONTROL INFORMATION, AND RELATED PRODUCT

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/908,630

(22) Filed: Jun. 22, 2020

(65) Prior Publication Data

US 2020/0322959 A1    Oct. 8, 2020

Related U.S. Application Data

(63) Continuation of application No. PCT/CN2018/081921, filed on Apr. 4, 2018.

(51) Int. Cl.
*H04W 72/04* (2009.01)
*H04L 1/18* (2006.01)
*H04L 5/00* (2006.01)

(52) U.S. Cl.
CPC ....... *H04W 72/0493* (2013.01); *H04L 1/1819* (2013.01); *H04L 5/0055* (2013.01);
(Continued)

(58) Field of Classification Search
CPC ......... H04W 72/0493; H04W 72/0413; H04W 72/042; H04W 72/0446; H04L 1/1819; H04L 5/0055; H04L 1/08; H04L 1/1635
See application file for complete search history.

(56) References Cited

U.S. PATENT DOCUMENTS

| | | | |
|---|---|---|---|
| 10,334,574 B2 | 6/2019 | Si et al. | |
| 2002/0141367 A1* | 10/2002 | Hwang | H04L 1/1671 370/335 |

(Continued)

FOREIGN PATENT DOCUMENTS

| | | |
|---|---|---|
| CN | 102148672 A | 8/2011 |
| CN | 102918793 A | 2/2013 |

(Continued)

OTHER PUBLICATIONS

U.S. Appl. No. 62/621,555, filed Jan. 2018, Soriaga.*

(Continued)

*Primary Examiner* — Jael M Ulysse

(74) *Attorney, Agent, or Firm* — Perkins Coie LLP

(57) ABSTRACT

Implementations of the present application disclose a method for transmitting uplink control information, and a related product. The method comprises: a terminal only receives one transmission block (TB) in a time unit of a preconfigured resource set, wherein the TB is transmitted over a continuous time period, and the preconfigured resource set comprises multiple time units; and the terminal only transmits one-bit feedback response information corresponding to the TB in an uplink time unit. According to the implementations of the present application, a terminal using a quasi-static ACK/NACK information determination method is configured in an NR system.

12 Claims, 5 Drawing Sheets

(52) U.S. Cl.
CPC ..... *H04W 72/042* (2013.01); *H04W 72/0413* (2013.01); *H04W 72/0446* (2013.01)

(56) References Cited

U.S. PATENT DOCUMENTS

| | | | | |
|---|---|---|---|---|
| 2012/0320805 | A1* | 12/2012 | Yang | H04L 1/1671 370/280 |
| 2012/0320852 | A1* | 12/2012 | Seo | H03M 13/6527 370/329 |
| 2013/0258914 | A1* | 10/2013 | Seo | H04L 1/1861 370/280 |
| 2014/0078944 | A1* | 3/2014 | Yang | H04L 5/0055 370/280 |
| 2014/0341050 | A1* | 11/2014 | Luo | H04L 25/0224 370/252 |
| 2014/0369242 | A1* | 12/2014 | Ng | H04L 5/001 370/280 |
| 2015/0009929 | A1* | 1/2015 | Park | H04W 24/08 370/329 |
| 2015/0078223 | A1* | 3/2015 | Yang | H04L 1/1861 370/280 |
| 2015/0208415 | A1 | 7/2015 | Xu et al. | |
| 2015/0326353 | A1* | 11/2015 | Ko | H04L 1/1816 714/749 |
| 2015/0349941 | A1* | 12/2015 | Papasakellariou | H04L 1/1614 370/280 |
| 2016/0065349 | A1* | 3/2016 | Papasakellariou | H04W 72/0406 370/329 |
| 2017/0019237 | A1* | 1/2017 | Yang | H04W 72/0446 |
| 2017/0164354 | A1* | 6/2017 | Yang | H04L 1/0057 |
| 2017/0257860 | A1 | 9/2017 | Nam et al. | |
| 2017/0288819 | A1* | 10/2017 | Chen | H04W 72/1284 |
| 2018/0006790 | A1* | 1/2018 | Park | H04W 72/0413 |
| 2018/0019843 | A1* | 1/2018 | Papasakellariou | H04L 1/1812 |
| 2018/0027549 | A1 | 1/2018 | Wang et al. | |
| 2018/0035329 | A1* | 2/2018 | Futaki | H04W 28/06 |
| 2018/0035430 | A1* | 2/2018 | Futaki | H04L 5/0044 |
| 2018/0049217 | A1 | 2/2018 | Dinan et al. | |
| 2018/0123765 | A1* | 5/2018 | Cao | H04L 1/1671 |
| 2018/0167932 | A1* | 6/2018 | Papasakellariou | H04L 1/00 |
| 2018/0206224 | A1* | 7/2018 | Hwang | H04W 72/0413 |
| 2018/0206246 | A1* | 7/2018 | Zhang | H04L 1/1896 |
| 2018/0219649 | A1* | 8/2018 | Ying | H04L 1/1819 |
| 2018/0270713 | A1* | 9/2018 | Park | H04W 74/0833 |
| 2018/0270807 | A1* | 9/2018 | Salem | H04L 5/0048 |
| 2018/0278380 | A1* | 9/2018 | Kim | H04L 1/1861 |
| 2019/0045489 | A1* | 2/2019 | He | H04W 72/12 |
| 2019/0150140 | A1* | 5/2019 | Patel | H04L 1/1887 370/336 |
| 2019/0150142 | A1* | 5/2019 | Huang | H04W 72/0446 370/336 |
| 2019/0150164 | A1* | 5/2019 | Nam | H04W 72/14 370/329 |
| 2019/0182807 | A1* | 6/2019 | Panteleev | H04L 1/0068 |
| 2019/0230656 | A1* | 7/2019 | Soriaga | H04W 72/042 |
| 2020/0022149 | A1* | 1/2020 | Beale | H04W 72/042 |
| 2020/0235891 | A1* | 7/2020 | Lei | H04L 1/1822 |

FOREIGN PATENT DOCUMENTS

| | | |
|---|---|---|
| CN | 103493418 A | 1/2014 |
| CN | 103873212 A | 6/2014 |
| CN | 102377537 B | 7/2014 |
| CN | 104052581 A | 9/2014 |
| CN | 106067845 A | 11/2016 |
| CN | 106788943 A | 5/2017 |
| CN | 107005365 A | 8/2017 |
| CN | 107027181 A | 8/2017 |
| CN | 107359970 A | 11/2017 |
| EP | 3499765 A1 | 6/2019 |
| JP | 2016503611 A | 2/2016 |
| KR | 20130113917 A | 10/2013 |
| WO | 2017016351 A1 | 2/2017 |
| WO | 2018028616 A1 | 2/2018 |

OTHER PUBLICATIONS

International Search Report of PCT/CN2018/081921 dated Jan. 7, 2019 (6 pages).
R1-1801163—Samsung, Offline on CA, 7.3.4.2, 3GPP TSG-RAN WG1 AH1801, Vancouver, Canada, Jan. 22-26, 2018 (2 pages).
R1-1802108—OPPO, Remaining details on HARQ-ACK transmission (7.1.3.4.2), 3GPP TSG RAN WG1 Meeting #92, Athens, Greece, Feb. 26-Mar. 2, 2018 (7 pages).
3GPP TSG RAN WG1#92—Athens, Greece, Feb. 26-Mar. 2, 2018—Agenda item 7.1.3.4.2—R1-1803409—Samsung, Second Offline Summary on CA Aspects (9 pages).
3GPP TSG RAN WG1#92—Athens, Greece, Feb. 26-Mar. 2, 2028—Agenda item 7.1.3.4.2—R1-1803300—Samsung, Offline Summary of CA Aspects (9 pages).
3GPP TSG RAN WG1 Meeting AH-1801—Vancouver, Canada, Jan. 22-16t11, 2018—RI-1800608—MediaTek Inc., On Remaining Details for HARQ-ACK Codebook (6 pages).
Examination Report dated Dec. 9, 2020 of Australian Patent Application No. 2018417494 (4 pages).
Supplementary European Search Report dated Dec. 10, 2020 of European Patent Application No. 18913896.9 (9 pages).
Examination Report No. 2 dated May 3, 2021 of Australian Application No. 2018417494 (4 pages).
CNIPA, First Office Action for Chinese Patent Application No. 202010411329.2, dated Jun. 22, 2021. 23 pages with English translation.
EPO, Examination Report for European Patent Application No. 17913896.9, dated Jun. 10, 2021. 4 pages.
IPA, Examination Report No. 3 for Australian Patent Application No. 2018417494, dated Aug. 30, 2021. 5 pages.
IPI, Examination Report for Indian Patent Application No. 202017026894, dated Aug. 27, 2021. 6 pages with English translation.
ShareTechNote "5G/NR—Frame Structure" [retrieved from internet on Aug. 30, 2021].<URL: https://web.archive.org/web/*/https://www.sharetechnote.com/html/5G/5G_FrameStructure.html> published on Aug. 26, 2017 as per Wayback Machine. 13 pages.
EPO, Examination Report for European Patent Application No. 18913896.9, dated Jun. 10, 2021. 4 pages.
Examination Report for European Application No. 18913896.9 dated Oct. 15, 2021. 4 pages.
Intel Corp. "Resource allocation for NR uplink control channel" R1-1611997; 3GPP TSF-RAN WG1 #87; dated Nov. 14-18, 2016. 4 pages.
Notice of Reasons for Refusal for Japanese Application No. 2020-544625 dated Oct. 5, 2021. 7 pages with English translation.
Notification of Reason for Refusal for Korean Application No. 10-2020-7024043 dated Nov. 3, 2021. 10 pages with English translation.
Notification to Grant a Patent for Chinese Application No. 202010411329.2 dated Sep. 7, 2021. 8 pages with English translation.
Samsung "Presentation of Specification/Report to TSG: TS38.213, Version 2.0.0" Tdoc RP-172703; 3GPP TSG-RAN Meeting #78; Dec. 18-21, 2017. 4 pages.
Decision of Refusal for Japanese Application No. 2020-544625 dated Jan. 21, 2022. 6 pages with English translation.
Notice of Acceptance for Australian Application No. 2018417494 dated Dec. 6, 2021. 3 pages.

* cited by examiner

METHOD FOR TRANSMITTING UPLINK CONTROL INFORMATION, AND RELATED PRODUCT

CROSS-REFERENCE TO RELATED APPLICATION

This application is a continuation application of International Application No. PCT/CN2018/081921, filed on Apr. 4, 2018, the entire disclosure of which is hereby incorporated by reference.

TECHNICAL FIELD

The present application relates to the field of communication technologies, and particularly, relates to a method for transmitting uplink control information and a related product.

BACKGROUND

At present, the 3rd generation partnership project 3GPP has determined that, when a terminal receives only one physical downlink shared channel (PDSCH) scheduled by downlink control information DCI format 1_0 on a main carrier, or only one DCI format 1_0 indicating semi-persistent scheduling (SPS) resource release on the main carrier, in which the value of the downlink assignment indicator (DAI) information field is 1, in a slot corresponding to a preconfigured resource set, the ACK/NACK codebook determined by the terminal only includes ACK/NACK information corresponding to the PDSCH or the DCI indicating SPS resource release.

Further, a new radio (NR) system supports slot aggregation, i.e., one transport block (TB) is repeatedly transmitted in consecutive time, and an independent PDSCH is in each slot, in this case, the terminal only supports single codeword transmission. When only one TB supporting the slot aggregation scheduled by DCI format 1_0 is received on the main carrier in the slot corresponding to the preconfigured resource set, how to carry out ACK/NACK feedback in this case has not been discussed.

SUMMARY

Implementations of the present application provides a method for transmitting uplink control information and a related product, in which a terminal adopting a quasi-static ACK/NACK information determination approach is configured in an NR system.

In a first aspect, an implementation of the present application provides a method for transmitting uplink control information. The method includes: a terminal receives only one transport block (TB) in time units of a preconfigured resource set, wherein the TB is transmitted in consecutive time, and the preconfigured resource set includes multiple time units; and the terminal transmits only 1-bit feedback response information corresponding to the TB in an uplink time unit.

In a second aspect, an implementation of the present application provides a method for transmitting uplink control information. The method includes: a network device transmits only one transport block (TB) in time units of a preconfigured resource set, wherein the TB is transmitted in consecutive time, and the preconfigured resource set includes multiple time units; and the network device receives only 1-bit feedback response information corresponding to the TB in an uplink time unit.

In a third aspect, an implementation of the present application provides a terminal. The terminal possesses functions of implementing acts of the terminal designed in the foregoing methods. The functions may be implemented by using hardware, or may be implemented by executing corresponding software through hardware. The hardware or software includes one or more modules corresponding to the foregoing functions. In a possible design, the terminal includes a processor. The processor is configured to support the terminal to execute a corresponding function in the above methods. Moreover, the terminal may further include a transceiver. The transceiver is used for supporting communication between the terminal and a network device. The terminal may further include a memory. The memory is used for coupling to the processor, and storing essential program instructions and data of the terminal.

In a fourth aspect, an implementation of the present application provides a network device. The network device possesses functions of implementing acts of the network device designed in the foregoing methods. The functions may be implemented by using hardware, or may be implemented by executing corresponding software through hardware. The hardware or software includes one or more modules corresponding to the foregoing functions. In a possible design, the network device includes a processor. The processor is configured to support the network device to perform corresponding functions in the foregoing method. Moreover, the network device may further include a transceiver. The transceiver is used for supporting communication between a terminal and the network device. The network device may further include a memory. The memory is used for coupling to the processor, and storing essential program instructions and data of the network device.

In a fifth aspect, an implementation of the present application provides a terminal. The terminal includes a processor, a memory, a communication interface, and one or more programs, wherein the one or more programs are stored in the memory and configured to be executed by the processor, and the program includes instructions for executing acts in any method of the first aspect in the implementation of the present application.

In a sixth aspect, an implementation of the present application provides a network device. The network device includes a processor, a memory, a communication interface, and one or more programs, wherein the one or more programs are stored in the memory and configured to be executed by the processor, and the program includes instructions for executing acts in any method of the second aspect in the implementation of the present application.

In a seventh aspect, an implementation of the present application further provides a computer-readable storage medium. The computer-readable storage medium stores computer programs for electronic data interchange. The computer programs enable a computer to execute all or part of acts as described in any method of the first aspect in the implementation of the present application.

In an eighth aspect, an implementation of the present application further provides a computer-readable storage medium. The computer-readable storage medium stores computer programs for electronic data interchange. The computer programs enable a computer to execute all or part of acts as described in any method of the second aspect in the implementation of the present application.

In a ninth aspect, an implementation of the present application further provides a computer program product.

The computer program product includes a non-transitory computer-readable medium storing computer programs. The computer programs are operable to enable a computer to execute all or part of acts as described in any method of the first aspect or the second aspect of implementations of the present application. The computer program product may be a software installation package.

BRIEF DESCRIPTION OF DRAWINGS

The following is a brief description of accompanying drawings which are required for describing implementations or the prior art.

DETAILED DESCRIPTION

The following describes technical solutions in implementations of the present application with reference to the accompanying drawings.

Figure 1:
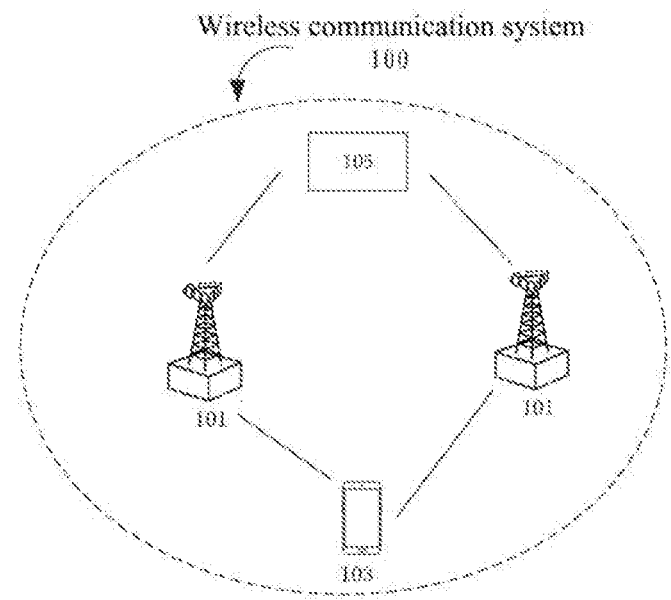
FIG. 1 is a diagram of a possible network architecture of a communication system according to an implementation of the present application.

As an example, FIG. 1 shows a wireless communication system involved in the present application. The wireless communication system 100 may work on a high frequency band, and the wireless communication system is not limited to a Long Term Evolution (LTE) system, it may be a 5th Generation mobile communication (the 5th Generation, 5G) system evolved in the future, a New Radio (NR) system, a Machine to Machine (M2M) system, or the like. The wireless communication system 100 may include: one or more network devices 101, one or more terminals 103, and a core network device 105. The network device 101 may be a base station. The base station may be used for communicating with one or more terminals, or may be used for communicating with one or more base stations with partial terminal functions (such as a macro base station and a micro base station). The base station may be a base transceiver station (BTS) in a time division synchronous code division multiple access (TD-SCDMA) system, or an evolutional node B (eNB) in an LTE system, or a base station in the 5G system or the NR system. In addition, the base station may be an Access Point (AP), a transport point (TRP), a Central Unit (CU), or other network entities, and may include parts or all of functions of the above network entities. The core network device 105 includes a device of a core network side such as an Access and Mobility Management Function (AMF) entity, a User Plane Function (UPF) entity, and a Session Management Function (SMF), etc. The terminal 103 may be distributed throughout the overall wireless communication system 100, which may be static or mobile. In some implementations of the present application, the terminal 103 may be a mobile device (e.g., a smart phone), a mobile station, a mobile unit, an M2M terminal, a wireless unit, a remote unit, a user agent, a mobile client, etc.

It should be noted that the wireless communication system 100 shown in FIG. 1 is only for more clearly explaining the technical solutions of the present application, and does not constitute a limitation to the present application. Those of ordinary skill in the art should know that, with evolution of network architecture and emergence of new service scenarios, the technical solutions provided by the present application are also applicable to similar technical problems.

Related technologies involved in the present application are described below.

At present, in a new radio (NR) system of the 5th-Generation (5G) mobile communication technology, feedback timing (HARQ timing) for dynamically indicating feedback response information is supported for a downlink physical shared channel (PDSCH), i.e., a terminal determines a preconfigured resource set which contains up to 8 values {K10, K11, K12, K13, K14, K15, K16, K17}. PDSCH is transmitted in slot n by downlink control information (DCI) signaling, the DCI contains a 3-bit target information field, the target information field is used for indicating a value K1i in the preconfigured resource set, and correspondingly, the terminal sends feedback response information ACK/NACK corresponding to the PDSCH in slot n+K1i. For DCI format 1_0, a corresponding preconfigured timing set is {1, 2, 3, 4, 5, 6, 7, 8} constantly. For DCI format 1_1, values in the preconfigured timing set are configured by high-level parameters.

In addition, the NR system supports multiplexing transmission of feedback response information ACK/NACK, i.e., multiple ACKs/NACKs corresponding to PDSCH are transmitted through one physical uplink control channel (PUCCH). For multiplexing transmission of ACK/NACK, two ACK/NACK generation modes are further supported: semi-static determination of the quantity of ACK/NACK bits (semi-static HARQ-ACK codebook) and dynamic determination of the quantity of ACK/NACK bits (dynamic HARQ-ACK codebook). When it is configured to be the semi-static HARQ-ACK codebook, the terminal determines the quantity of ACK/NACK bits according to the maximum and minimum values in the preconfigured resource set. For example, in a case of single carrier and single codeword transmission, if the preconfigured resource set is {1, 2, 3, 4, 5, 6, 7, 8}, then the quantity of ACK/NACK bits is 8−1=7 bits.

The implementations of the present application provide following implementations, which will be described in detail below with reference to the accompanying drawings.

Figure 2A:
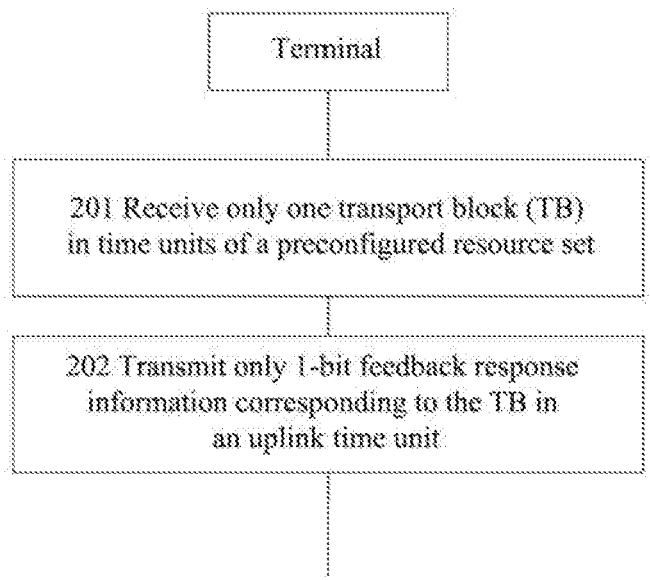
FIG. 2A is a flow chart of a method for transmitting uplink control information provided by an implementation of the present application.

Please refer to FIG. 2A which is a method for transmitting uplink control information provided by an implementation of the present application, applied to the terminal in the above exemplary communication system. The method includes the following acts 201-202.

In act 201, the terminal receives only one transport block (TB) in time units of a preconfigured resource set, wherein the TB is transmitted in consecutive time, and the preconfigured resource set includes multiple time units; wherein, the TB may be repeatedly transmitted in consecutive time.

In act 202, the terminal transmits only 1-bit feedback response information corresponding to the TB in an uplink time unit.

It can be seen that in the implementation of the present application, the terminal receives only one TB in the time units of the preconfigured resource set, and the terminal transmits only 1-bit feedback response information corresponding to the TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

In one possible example, before the terminal transmits only 1-bit feedback response information corresponding to the TB in the uplink time unit, the method further includes: the terminal determines that the TB satisfies a predetermined condition.

In one possible example, the predetermined condition includes at least one of the following (1)-(5).

(1) The TB is scheduled by a downlink control information format DCI format 1_0, and a value of a downlink assignment indicator (DAI) information field is 1.

(2) A format of an uplink control channel (PUCCH) for transmitting feedback response information is format 0 or format 1; wherein the format of the PUCCH may be preconfigured by a base station.

(3) The quantity of first time units is greater than or equal to that of second time units, and a last time unit in the first time units is a last time unit in the second time units, wherein the first time units are time units occupied by transmission of TB, and the second time units are time units corresponding to the preconfigured resource set; wherein, the first time units may be time units occupied by the TB repeat transmissions.

Figure 2B:
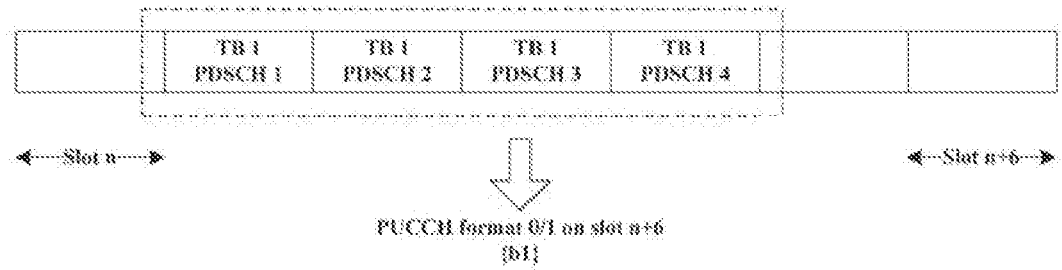
FIG. 2B is a schematic diagram of a terminal transmitting feedback response information based on reception of TB1 provided by an implementation of the present application.

As shown in FIG. 2B, it is assumed that the preconfigured resource set includes 4 slots, the quantity of PDSCH repeat transmissions is configured to be 4 by higher layer signaling, and the last slot occupied by TB1 is the last slot in the preconfigured resource set, i.e., the currently transmitted TB1 satisfies the condition (3), so the terminal only feeds back 1-bit feedback response information ACK/NACK in an uplink slot.

(4) The quantity of third time units is less than that of the first time units, and the third time units are time units located after the last time unit of the first time units in the preconfigured resource set.

(5) There is no PDCCH monitoring occasion in the third time units.

Figure 2C:
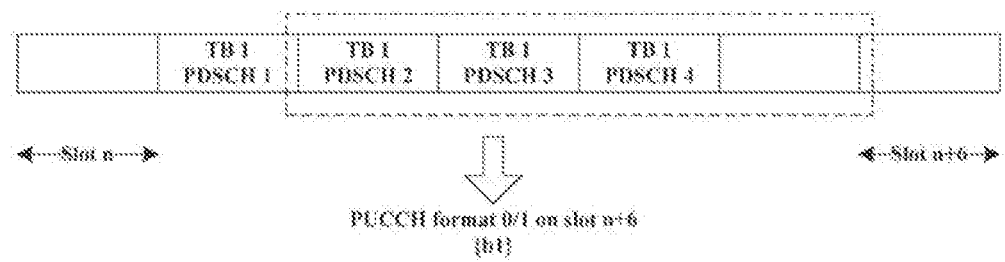
FIG. 2C is another schematic diagram of a terminal transmitting feedback response information based on reception of TB1 provided by an implementation of the present application.

As shown in FIG. 2C, it is assumed that the preconfigured resource set includes 4 slots, the quantity of PDSCH repeat transmissions is configured to be 4 by higher layer signaling, the transport block TB1 occupies first 3 slots in the preconfigured resource set, and slot n+5 is not a monitoring occasion of PDCCH (i.e., DCI indicating SPS resource release does not exist in slot n+5). The preconfigured resource set is insufficient to transmit a new TB (occupying 4 slots), i.e., the currently transmitted TB1 satisfies the conditions (4) (5), so the terminal only feeds back 1-bit feedback response information ACK/NACK in the uplink slot.

In one possible example, time units in the preconfigured resource set are used for transmitting different downlink data; and the amount of feedback response information transmitted in the uplink time units is determined by the quantity of time units in the preconfigured resource set.

It can be seen that, in this example, since the time units in the preconfigured resource set can be used for transmitting different downlink data, the amount of feedback response information is determined according to the quantity of time units in the preconfigured resource set, thus ensuring that the terminal and the base station have the same understanding on the feedback response information to realize correct demodulation.

In one possible example, the terminal is configured to be in a semi-static feedback response information sequence determination mode.

The semi-static feedback response information sequence determination mode is also referred to as Type-1 HARQ-ACK codebook determination in the standard.

Figure 3:
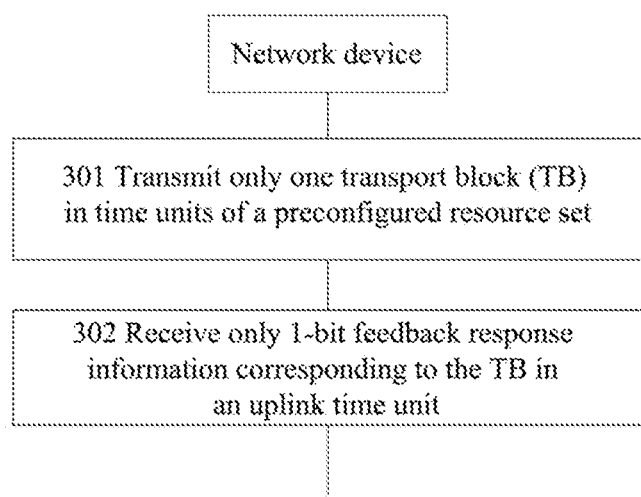
FIG. 3 is a flow chart of another method for transmitting uplink control information provided by an implementation of the present application.

Consistent with the implementation shown in FIG. 2A, please refer to FIG. 3 which is another method for transmitting uplink control information provided by an implementation of the present application, applied to the network device in the above-mentioned exemplary communication system. The method includes the following acts 301-302.

In act 301, the network device transmits only one TB in time units of a preconfigured resource set, wherein the TB is repeatedly transmitted in consecutive time, and the preconfigured resource set includes multiple time units.

In act 302, the network device receives only 1-bit feedback response information corresponding to the TB in an uplink time unit.

It can be seen that in the implementation of the present application, the terminal receives only one TB in the time units of the preconfigured resource set, and the terminal transmits only 1-bit feedback response information corresponding to the TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

In one possible example, the TB satisfies a predetermined condition.

In one possible example, the predetermined condition includes at least one of the following (1)-(5).

(1) The TB is scheduled by a downlink control information format DCI format 1_0, and a value of a downlink assignment indicator (DAI) information field is 1.

(2) A format of an uplink control channel (PUCCH) for transmitting feedback response information is format 0 or format 1.

(3) The quantity of first time units is greater than or equal to that of second time units, and a last time unit in the first time units is a last time unit in the second time units, wherein the first time units are time units occupied by transmission of TB, and the second time units are time units corresponding to the preconfigured resource set.

(4) The quantity of third time units is less than that of the first time units, and the third time units are time units located after the last time unit of the first time units in the preconfigured resource set.

(5) There is no PDCCH monitoring occasion in the third time units.

In one possible example, time units in the preconfigured resource set are used for transmitting different downlink data; and the amount of feedback response information transmitted in the uplink time units is determined by the quantity of time units in the preconfigured resource set.

In one possible example, the terminal is configured to be in a semi-static feedback response information sequence determination mode.

Figure 4:
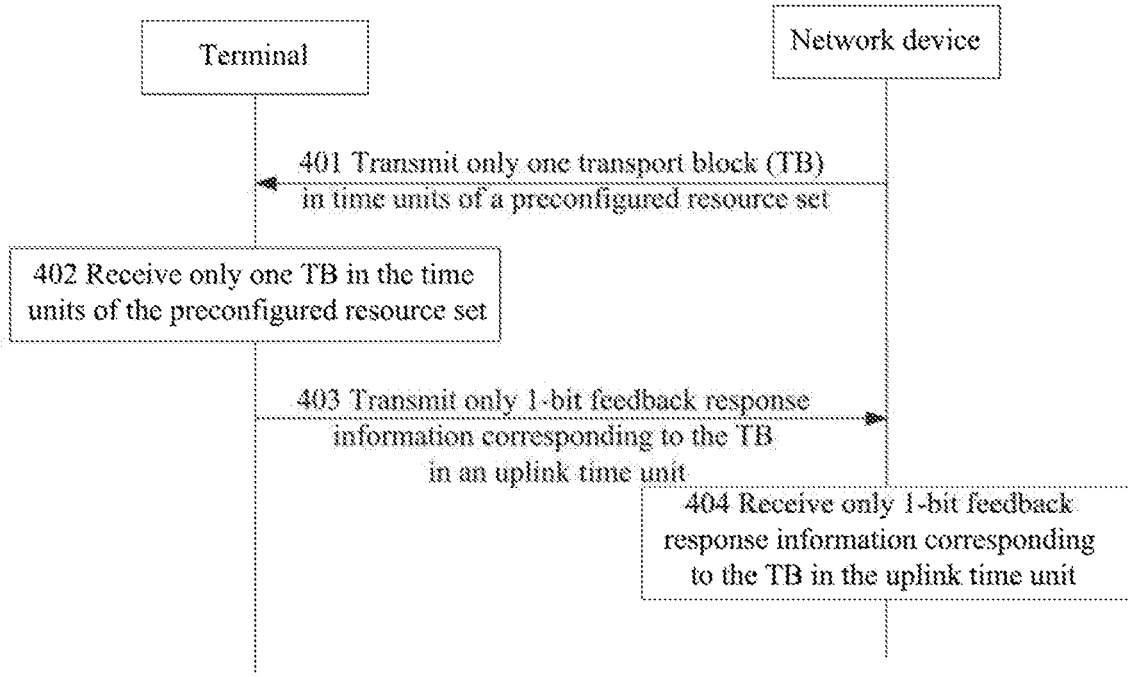
FIG. 4 is a flow chart of another method for transmitting uplink control information provided by an implementation of the present application.

Consistent with the implementations shown in FIG. 2A and FIG. 3, please refer to FIG. 4 which is a method for transmitting uplink control information provided by an implementation of the present application, applied to the terminal and the network device in the above-mentioned exemplary communication system. The method includes the following acts 401-404.

In act 401, the network device transmits only one TB in time units of a preconfigured resource set, wherein the TB is repeatedly transmitted in consecutive time, and the preconfigured resource set includes multiple time units.

In act 402, the terminal receives only one transport block (TB) in time units of a preconfigured resource set, wherein the TB is repeatedly transmitted in consecutive time, and the preconfigured resource set includes multiple time units.

In act 403, the terminal transmits only 1-bit feedback response information corresponding to the TB in an uplink time unit.

In act 404, the network device receives only 1-bit feedback response information corresponding to the TB in the uplink time unit.

It can be seen that in the implementation of the present application, the terminal receives only one TB in the time units of the preconfigured resource set, and the terminal transmits only 1-bit feedback response information corresponding to the TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

Figure 5:
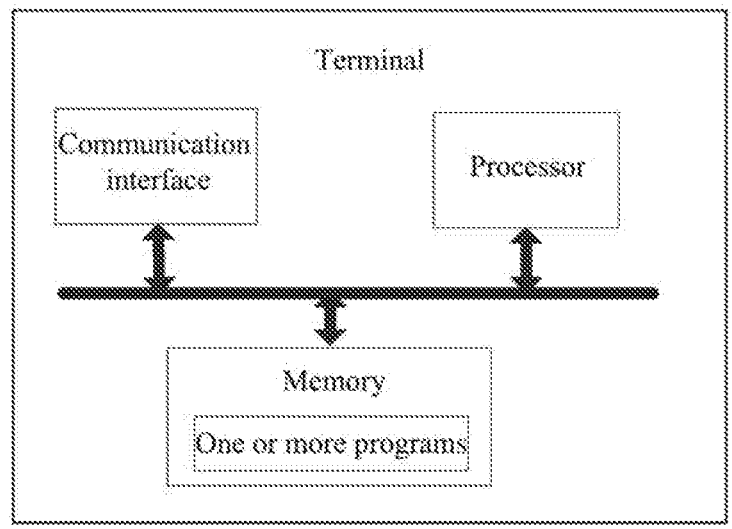
FIG. 5 is a schematic diagram of structure of a terminal provided by an implementation of the present application.

Consistent with the above implementations, please refer to FIG. 5 which is a schematic structural diagram of a terminal according to an implementation of the present application. As shown in FIG. 5, the terminal includes a processor, a memory, a communication interface, and one or more programs, wherein the one or more programs are stored in the memory and configured to be executed by the processor, and the one or more programs include instructions for performing the following acts: receiving only one transport block (TB) in time units of a preconfigured resource set, wherein the TB is repeatedly transmitted in consecutive time, and the preconfigured resource set includes multiple time units; and transmitting only 1-bit feedback response information corresponding to the TB in an uplink time unit.

It can be seen that in the implementation of the present application, the terminal receives only one TB in the time units of the preconfigured resource set, and the terminal transmits only 1-bit feedback response information corresponding to TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

In one possible example, the program further includes instructions for performing the following acts: determining that the TB satisfies a predetermined condition before only 1-bit feedback response information corresponding to the TB is transmitted in the uplink time unit.

In one possible example, the predetermined condition includes at least one of the following: the TB being scheduled by a downlink control information format DCI format 1_0, and a value of a downlink assignment indicator (DAI) information field being 1; a format of an uplink control channel (PUCCH) for transmitting feedback response information being format 0 or format 1; the quantity of first time units being greater than or equal to that of second time units, and a last time unit in the first time units being a last time unit in the second time units, wherein the first time units are time units occupied by transmission of TB, and the second time units are time units corresponding to the preconfigured resource set; the quantity of third time units being less than that of the first time units, and the third time units being time units located after the last time unit of the first time units in the preconfigured resource set; no PDCCH monitoring occasion in the third time units.

In one possible example, time units in the preconfigured resource set are used for transmitting different downlink data; and the amount of feedback response information transmitted in the uplink time units is determined by the quantity of time units in the preconfigured resource set.

In one possible example, the terminal is configured to be in a semi-static feedback response information sequence determination mode.

Figure 6:
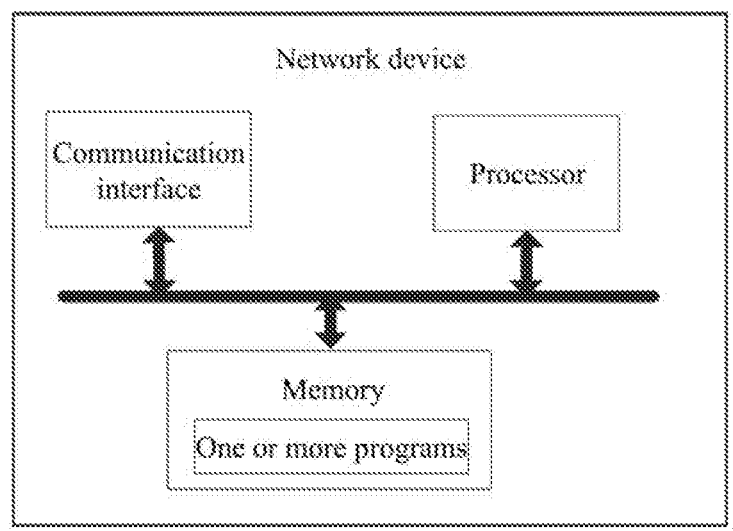
FIG. 6 is a schematic diagram of structure of a network device provided by an implementation of the present application.

Consistent with the above implementation, please refer to FIG. 6 which is a schematic structural diagram of a network device according to an implementation of the present application. As shown in FIG. 6, the network device includes a processor, a memory, a communication interface, and one or more programs, wherein the one or more programs are stored in the memory and configured to be executed by the processor, and the program includes instructions for performing the following acts: transmitting only one TB in time units of a preconfigured resource set, wherein the TB is repeatedly transmitted in consecutive time, and the preconfigured resource set includes multiple time units; and receiving only 1-bit feedback response information corresponding to the TB in an uplink time unit.

It can be seen that in the implementation of the present application, the terminal receives only one TB in the time units of the preconfigured resource set, and the terminal transmits only 1-bit feedback response information corresponding to the TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

In one possible example, the TB satisfies a predetermined condition.

In one possible example, the predetermined condition includes at least one of the following: the TB being scheduled by a downlink control information format DCI format 1_0, and a value of a downlink assignment indicator (DAI) information field being 1; a format of an uplink control channel (PUCCH) for transmitting feedback response information being format 0 or format 1; the quantity of first time units being greater than or equal to that of second time units, and a last time unit in the first time units being a last time unit in the second time units, wherein the first time units are time units occupied by transmission of TB, and the second time units are time units corresponding to the preconfigured resource set; the quantity of third time units being less than that of the first time units, and the third time units being time units located after the last time unit of the first time units in the preconfigured resource set; no PDCCH monitoring occasion in the third time units.

In one possible example, time units in the preconfigured resource set are used for transmitting different downlink data; and the amount of feedback response information transmitted in the uplink time units is determined by the quantity of time units in the preconfigured resource set.

In one possible example, the terminal is configured to be in a semi-static feedback response information sequence determination mode.

The above describes the solutions provided in the implementations of the present application mainly from a perspective of interaction between network elements. It can be understood that the terminal and the network device include corresponding hardware structures and/or software modules for performing various functions, so as to implement the above functions. A person skilled in the art should easily understand that, in combination with units and algorithm steps in examples described with reference to the implementations disclosed herein, the present application may be implemented by hardware or a combination of hardware and computer software. Whether a function is performed by hardware or computer software driving hardware depends on a particular application and a design constraint condition of the technical solution. A person skilled in the art may use different methods to implement the described functions for each particular application, but it should not be considered that such an implementation goes beyond the scope of the present application.

Division for functional units can be performed for the terminal and network device in the implementations of the present application according to the above method examples. For example, various functional units may be divided according to various functions, or two or more functions can be integrated into one processing unit. The aforementioned integrated unit may be implemented in a form of hardware, or may be implemented in a form of a software program module. It should be noted that, the division of the units in the implementations of the present application is illustrative, and is merely the division of logical functions. Other division modes may be used in actual implementations.

Figure 7:
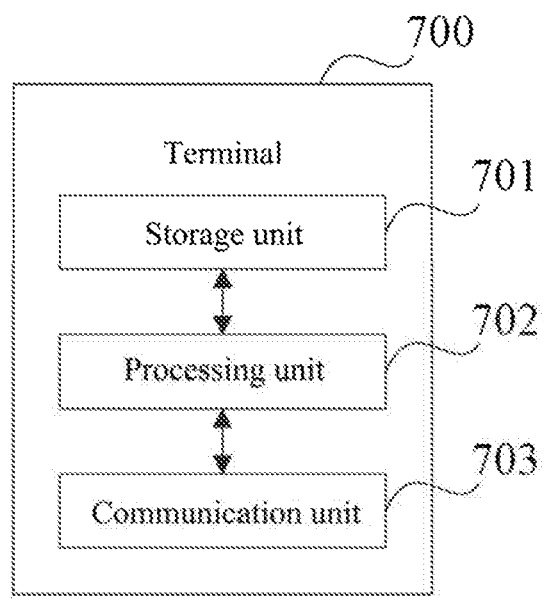
FIG. 7 is a composition block diagram of functional units of a terminal provided by an implementation of the present application.

In the case that an integrated unit is used, FIG. 7 illustrates a block diagram of possible composition of possible functional units of a terminal related to the above implementations. A terminal 700 includes a processing unit 702 and a communication unit 703. The processing unit 702 is used for controlling and managing actions of the terminal. For example, the processing unit 702 is used for supporting the terminal to perform acts 201, 202 in FIG. 2A, acts 402, 403 in FIG. 4, and/or other processes of the techniques described herein. The communication unit 703 is used for supporting communication between the terminal and other devices, such as communication between the terminal and a network device. The terminal may further include a storage unit 701 used for storing program codes and data of the terminal.

The processing unit 702 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit 702 may implement or execute various illustrative logical blocks, modules, and circuits described in combination with disclosed contents of the present application. A processor may also be a combination for implementing computing functions, e.g., a combination including one or more microprocessors, a combination of a DSP and a microprocessor. The communication unit 703 may be a transceiver or a transceiving circuit. The storage unit 701 may be a memory.

The processing unit 702 is configured to receive only one transport block (TB) through the communication unit in time units of a preconfigured resource set, wherein the TB is repeatedly transmitted in consecutive time, and the preconfigured resource set includes multiple time units; and transmit only 1-bit feedback response information corresponding to the TB through the communication unit in an uplink time unit.

It can be seen that in the implementation of the present disclosure, the terminal receives only one TB in the time units of the preconfigured resource set, and the terminal transmits only 1-bit feedback response information corresponding to the TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

In one possible example, the processing unit 702 is further configured to determine that the TB satisfies a predetermined condition before transmitting only 1-bit feedback response information corresponding to the TB through the communication unit 703 in the uplink time unit.

In one possible example, the predetermined condition includes at least one of the following: the TB being scheduled by a downlink control information format DCI format 1_0, and a value of a downlink assignment indicator (DAI) information field being 1; a format of an uplink control channel (PUCCH) for transmitting feedback response information being format 0 or format 1; the quantity of first time units being greater than or equal to that of second time units, and a last time unit in the first time units being a last time unit in the second time units, wherein the first time units are time units occupied by transmission of TB, and the second time units are time units corresponding to the preconfigured resource set; the quantity of third time units being less than that of the first time units, and the third time units being time units located after the last time unit in the first time units in the preconfigured resource set; no PDCCH monitoring occasion in the third time units.

In one possible example, time units in the preconfigured resource set are used for transmitting different downlink data; and the amount of feedback response information transmitted in the uplink time units is determined by the quantity of time units in the preconfigured resource set.

In one possible example, the terminal is configured to be in a semi-static feedback response information sequence determination mode.

When the processing unit 702 is a processor, the communication unit 703 is a communications interface, and the storage unit 701 is a memory. The terminal related to implementations of the present application may be the terminal shown in FIG. 5.

Figure 8:
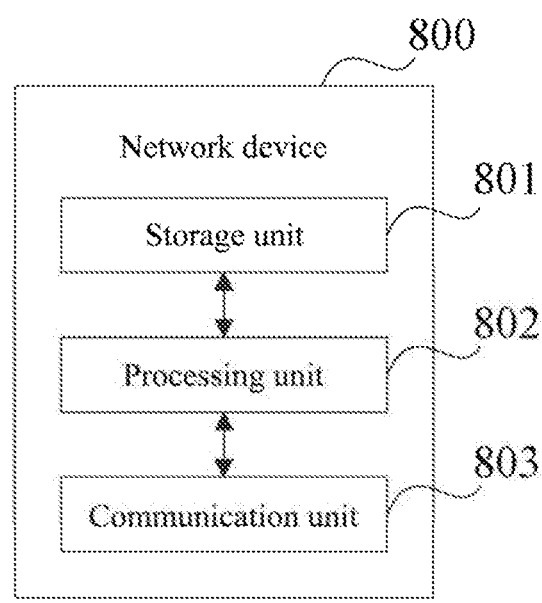
FIG. 8 is a composition block diagram of functional units of a network device provided by an implementation of the present application.

In a case that an integrated unit is used, FIG. 8 illustrates a block diagram of possible composition of functional units of the network device related to the above implementations. A network device 800 includes a processing unit 802 and a communication unit 803. The processing unit 802 is used for controlling and managing actions of the network device. For example, the processing unit 802 is used for supporting the network device to execute acts 301 and 302 in FIG. 3, acts 401 and 404 in FIG. 4, and/or other processes for the techniques described in this document. The communication unit 803 is used for supporting communication between the network device and other devices, such as communication with a terminal. The network device further includes a storage unit 801 used for storing program codes and data of the network device.

The processing unit 802 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit 802 may implement or execute various illustrative logical blocks, modules, and circuits described in combination with disclosed contents of the present application. A processor may also be a combination for implementing computing functions, e.g., a combination including one or more microprocessors, a combination of a DSP and a microprocessor. The communication unit 803 may be a transceiver or a transceiving circuit. The storage unit 801 may be a memory.

The processing unit 802 is configured to transmit only one transport block (TB) through the communication unit in time units of a preconfigured resource set, wherein the TB is repeatedly transmitted in consecutive time, and the preconfigured resource set includes multiple time units; and receive only 1-bit feedback response information corresponding to the TB through the communication unit in an uplink time unit.

It can be seen that in the implementation of the present disclosure, the terminal receives only one TB in the time units of the preconfigured resource set, and the terminal transmits only 1-bit feedback response information corresponding to the TB in the uplink time unit. Since the TB is transmitted in consecutive time and the preconfigured resource set includes multiple time units, that is, for the case where the terminal receives only one TB in the time units of the preconfigured resource set, the terminal can determine that there is no new TB in the time units of the current preconfigured resource set, accordingly, only 1-bit feedback response information corresponding to the TB is transmitted in the uplink time unit. Therefore, the terminal adopting the quasi-static ACK/NACK information determination approach is configured in the NR system, the feedback overhead is reduced, and the system efficiency is improved.

In one possible example, the TB satisfies a predetermined condition.

In one possible example, the predetermined condition includes at least one of the following: the TB being scheduled by a downlink control information format DCI format 1_0, and a value of a downlink assignment indicator (DAI) information field being 1; a format of an uplink control channel (PUCCH) for transmitting feedback response information being format 0 or format 1; the quantity of first time units being greater than or equal to that of second time units, and a last time unit in the first time units being a last time unit in the second time units, wherein the first time units are time units occupied by transmission of TB, and the second time units are time units corresponding to the preconfigured resource set; the quantity of third time units being less than that of the first time units, and the third time units being time units located after the last time unit of the first time units in the preconfigured resource set; no PDCCH monitoring occasion in the third time units.

In one possible example, time units in the preconfigured resource set are used for transmitting different downlink data; and the amount of feedback response information transmitted in the uplink time units is determined by the quantity of time units in the preconfigured resource set.

In one possible example, the terminal is configured to be in a semi-static feedback response information sequence determination mode.

When the processing unit 802 is a processor, the communication unit 803 is a communication interface, and the storage unit 801 is a memory, the network device related to implementations of the present application may the network device shown in FIG. 6.

An implementation of the present application also provides a computer readable storage medium. The computer readable storage medium stores a computer program for electronic data interchange, wherein the computer program makes a computer execute parts or all of the acts described for the terminal in the above method implementations.

An implementation of the present application also provides a computer readable storage medium. The computer readable storage medium stores a computer program for electronic data interchange, and the computer program causes a computer to execute parts or all of the acts described for the network device in the above method implementations.

An implementation of the present application also provides a computer program product, wherein the computer program product includes a non-transitory computer readable storage medium storing a computer program, and the computer program is operable to make a computer execute parts or all of the acts described for the terminal in the above method implementations. The computer program product may be a software installation package.

An implementation of the present application also provides a computer program product, wherein the computer program product includes a non-transitory computer readable storage medium storing a computer program, and the computer program is operable to make a computer execute parts or all of the acts described for the network device in the above method. The computer program product may be a software installation package.

The acts of the method or algorithm described in the implementations of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to the processor such that the processor can read information from the storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the flows or functions according to the implementations of the present application are generated in whole or in parts. The computer may be a general purpose computer, a special purpose computer, a computer network, or other programmable apparatuses. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific implementations described above further explain the purpose, the technical scheme and the beneficial effects of the implementations of the present application in detail. It should be understood that the above is only the specific implementations of the implementations of the present application, and is not used to limit the protection scope of the implementations of the present application. Any modification, equivalent substitution, improvement, etc. made on the basis of the technical scheme of the implementations of the present application shall be included in the protection scope of the implementations of the present application.

What is claimed is:

1. A method for uplink control information transmission, comprising:

receiving, by a terminal, first transport block (TB) in each slot of multiple slots contained in a preconfigured resource set, wherein the first TB is repeatedly transmitted in the multiple slots; and transmitting, by the terminal, only 1-bit feedback response information corresponding to multiple first TB s transmitted in the multiple slots in an uplink time unit, wherein, before the terminal transmits the only 1-bit feedback response information corresponding to the multiple first TB s transmitted in the multiple slots in the uplink time unit, the method further comprises:

determining, by the terminal, that the first TB satisfies a predetermined condition, wherein the predetermined condition comprises at least one of:

a quantity of first time units being greater than or equal to a quantity of second time units, and a last time unit in the first time units being a last time unit in the second time units, wherein the first time units are time units occupied by transmission of the first TB, and the second time units are time units corresponding to the preconfigured resource set; or a quantity of third time units being less than the quantity of the first time units, and the third time units being time units located after the last time unit of the first time units in the preconfigured resource set, and no PDCCH monitoring occasion in the third time units.

2. The method according to claim 1, wherein the terminal is configured with a semi-static feedback response information sequence determination mode.

3. The method according to claim 2, wherein the semi-static feedback response information sequence determination mode is Type-1 HARQ-ACK codebook determination.

4. The method according to claim 1, wherein the multiple slots are time resources for the first TB transmission in the consecutive slots, each of the consecutive slots comprises at least one time unit.

5. A method for uplink control information transmission, comprising:

transmitting, by a network device, first transport block (TB) in each slot of multiple slots contained in a preconfigured resource set, wherein the first TB is repeatedly transmitted in the multiple slots; and receiving, by the network device, only 1-bit feedback response information corresponding to multiple first TB s transmitted in the multiple slots in an uplink time unit, wherein the first TB satisfies a predetermined condition, and wherein the predetermined condition comprises at least one of:

a quantity of first time units being greater than or equal to a quantity of second time units, and a last time unit in the first time units being a last time unit in the second time units, wherein the first time units are time units occupied by transmission of the first TB, and the second time units are time units corresponding to the preconfigured resource set; or a quantity of third time units being less than the quantity of the first time units, and the third time units being time units located after the last time unit of the first time units in the preconfigured resource set, and no PDCCH monitoring occasion in the third time unit.

6. The method according to claim 5, wherein the terminal is configured with a semi-static feedback response information sequence determination mode.

7. The method according to claim 6, wherein the semi-static feedback response information sequence determination mode is Type-1 HARQ-ACK codebook determination.

8. The method according to claim 5, wherein the multiple slots are time resources for the first TB transmission in the consecutive slots, each of the consecutive slots comprises at least one time unit.

9. A terminal, comprising a processor and a transceiver; wherein the processor is configured to receive first transport block (TB) through the transceiver in each slot of multiple slots contained in a preconfigured resource set, wherein the first TB is repeatedly transmitted in the multiple slots; and transmit only 1-bit feedback response information corresponding to the multiple first TB s transmitted through the transceiver in the multiple slots in an uplink time unit, wherein the processor is further configured to determine that the first TB satisfies a predetermined condition, wherein the predetermined condition comprises at least one of:

a quantity of first time units being greater than or equal to that of a quantity of second time units, and a last time unit in the first time units being a last time unit in the second time units, wherein the first time units are time units occupied by transmission of the first TB, and the second time units are time units corresponding to the preconfigured resource set; or a quantity of third time units being less than that the quantity of the first time units, and the third time units being time units located after the last time unit of the first time units in the preconfigured resource set, and no PDCCH monitoring occasion in the third time units.

10. The terminal according to claim 9, wherein the terminal is configured with a semi-static feedback response information sequence determination mode.

11. The terminal according to claim 10, wherein the semi-static feedback response information sequence determination mode is Type-1 HARQ-ACK codebook determination.

12. The terminal according to claim 9, wherein the multiple slots are time resources for the first TB transmission in the consecutive slots, each of the consecutive slots comprises at least one time unit.

* * * * *